US012760380B2

(12) United States Patent
Câmara Campos Junior

(10) Patent No.: US 12,760,380 B2
(45) Date of Patent: Oct. 13, 2026

(54) REOXIDATION RETARDANT AND METHOD FOR HINDERING REOXIDATION OF DIRECT REDUCED IRON

(71) Applicant: TERNIUM MEXICO S.A. de C.V., San Nicolás de los Garza (MX)

(72) Inventor: Fernando Luiz Câmara Campos Junior, San Nicolás de los Garza (MX)

(73) Assignee: Ternium México S.A. de C.V., San Nicolás de los Garza (MX)

( * ) Notice: Subject to any disclaimer, the term of this patent is extended or adjusted under 35 U.S.C. 154(b) by 0 days.

(21) Appl. No.: 19/170,626

(22) Filed: Apr. 4, 2025

(65) Prior Publication Data

US 2026/0308704 A1 Oct. 8, 2026

(51) Int. Cl.
*C21B 13/00* (2006.01)
*C09D 5/08* (2006.01)

(52) U.S. Cl.
CPC .............. *C21B 13/008* (2013.01); *C09D 5/08* (2013.01)

(58) Field of Classification Search
None
See application file for complete search history.

(56) References Cited

U.S. PATENT DOCUMENTS 4,254,167 A * 3/1981 Sulzbacher ......... C21B 13/0086 428/471
9,464,338 B2 10/2016 Hendrickson et al.
2008/0028890 A1 2/2008 Hey et al.
2012/0272787 A1* 11/2012 de Araujo ............... C22B 1/244 75/330

OTHER PUBLICATIONS

Viscosity of Glycerol and Its Aqueous Solutions, J. B. Segur and Helen E. Oberstar, Industrial & Engineering Chemistry 1951 43 (9), 2117-2120 (Year: 1951).*

* cited by examiner

*Primary Examiner* — Keith D. Hendricks
*Assistant Examiner* — Nikolas Takuya Pullen
(74) *Attorney, Agent, or Firm* — Knobbe, Martens, Olson & Bear, LLP

(57) ABSTRACT

A method for hindering or decreasing reoxidation of direct reduced iron (DRI) granular material (pellets or lumps) comprising applying a mixture of glycerin and water. The reoxidation retardant is applied over the surface of DRI granules. A granular iron material including DRI treated with the reoxidation retardant is also disclosed.

11 Claims, 3 Drawing Sheets

REOXIDATION RETARDANT AND METHOD FOR HINDERING REOXIDATION OF DIRECT REDUCED IRON

BACKGROUND

Field

This application relates to production and handling of direct reduced iron (DRI), also known in the steel industry as sponge iron or direct reduced iron (DRI), which is an intermediate granular solid product containing metallic iron, typically in the form of agglomerates, pellets, briquettes or lumps, produced by reduction of iron ores at temperatures below the melting temperature of iron, and which is used for producing steel.

Description of the Related Art

Production of high-quality grades of steel requires virgin metallic iron units, meaning metallic iron obtained from iron ores (e.g., DRI). Recycled steel scrap is used in limited amounts as long as the undesired elements it contains do not cause quality problems in the final steel products.

There are two routes to produce metallic iron by reduction of iron ores, one is the blast furnace process that produces liquid and carbon-saturated pig iron, and another route is direct reduction where iron oxides of iron ores are reduced at high temperature but without melting the metallic-iron product which is discharged from the direct reduction furnace in the solid state. As mentioned above, metallic-iron product of the direct reduction processes is known in the steel industry as "sponge iron" or "direct reduced iron" or simply "DRI".

DRI has become a generic term applied to a variety of metallized-iron products from direct reduction processes where iron oxides in iron ores are chemically reduced to metallic iron by reactions with $H_2$ and/or CO.

Reduction of solid iron oxides with gaseous reductants, $H_2$ and CO or only $H_2$, leaves small spaces where oxygen was removed and that is the origin of the term "sponge iron".

The reduction reactions involved in reducing iron oxides are:

$$Fe_2O_3(s)+3CO(g)\leftrightarrow 2Fe(s)+3CO_2(g)$$

$$Fe_2O_3(s)+3H_2(g)\leftrightarrow 2Fe(s)+3H_2O(g)$$

After reduction, the metallic iron in DRI can undergo reoxidation if contacted with oxygen and/or water of the atmospheric air.

DRI is a reactive material that when exposed to atmospheric oxygen or humid air or water develops heat since oxidation of iron is exothermic. In some cases, the storage time of DRI in open air is shortened as a measure to avoid spontaneous ignition of DRI piles.

It is known that one of the factors for high reoxidation reactivity of DRI is attributable to its specific surface area, which varies in a range of about 0.5 $m^2/g$ to 4.0 $m^2/g$, depending on the particle size.

Reoxidation of DRI pellets in contact with oxygen and humidity of ambient air occurs, for example, through the following chemical reactions:

$$Fe(s)+O_2(g)\rightarrow FeO(s)$$

$$2Fe(s)+3/2O_2(g)\rightarrow Fe_2O_3(s)$$

$$Fe(s)+H_2O(g\text{ or }l)\rightarrow FeO(s)+H_2(g)$$

$$2Fe(s)+3H_2O(g\text{ or }l)\rightarrow Fe_2O_3(s)+H_2(g)$$

DRI normally contains carbon, which may be in the form of graphite or "free carbon" and preferably chemically combined with iron as iron carbide $Fe_3C$. Carbon then can contribute to DRI reoxidation by raising the temperature due to its oxidation with oxygen, for example, according to the following reactions:

$$Fe(s)+C(s)+2H_2O\rightarrow FeO+2H_2(g)+CO(g)$$

$$Fe(s)+C(s)+O_2(g)\rightarrow FeO(s)+CO(g)$$

The above reactions generate heat which increases the temperature of the material and scales up the extent of the oxidation reactions.

When DRI pellets or lumps are stored in bulk piles, the risk that hot spots develop and reoxidation propagation is latent.

It is known that DRI stored in bulk piles in contact with atmospheric oxygen can start reoxidation when the temperature is above 150° C.

To prevent such reoxidation, several measures have been proposed and practiced in the past, for example, cooling DRI to near-ambient temperature before discharging it from the reduction furnace. Cooling of DRI can be done by circulating a non-oxidizing gas through a bed of DRI pellets within the reduction reactor or in a separate DRI cooling vessel. However, the risk of reoxidation persists and some measures have to be taken to prevent such reoxidation.

Another method of inhibiting DRI reoxidation is coating DRI pellets with some materials such as cement, polymers, resins, waxes and hydrocarbons, or forming a controlled layer of iron oxides on the surface of DRI pellets.

Another method for inhibiting reoxidation of granular DRI is to compress it into briquettes. In this way, the porosity of briquettes is considerably lower than the porosity of DRI.

SUMMARY

The present application provides a method and a retardant that hinders reoxidation of DRI. The method comprises spraying a solution of glycerin and water over the surface of DRI bulk material.

Glycerin, also known as glycerol or propanetriol, has the chemical formula $C_3H_8O_3$, a polar compound due to its hydroxyl groups (—OH) which make it compatible and highly miscible with water, forming homogenous mixtures. Glycerin has a density of 1.26 $g/cm^3$.

An advantage of glycerin is that it is non-toxic therefore it can be safely and environmentally friendly used in the steel industry in any proportion and temperature. When glycerin is heated above 290° C., it evaporates showing a caramelized odor.

According to some embodiments, a reoxidation retardant comprising a mixture of glycerin and water for hindering reoxidation of DRI granular material is provided.

According to some embodiments, a method for hindering reoxidation of DRI granular material by spraying a reoxidation retardant comprising a mixture of glycerin and water over DRI bulk granular material is provided.

According to some embodiments, a reoxidation retardant and a method that improves the safety of industrial operations and decreases economic losses due to loss of metallization in connection with the storage and handling of DRI are disclosed.

According to some embodiments, a reoxidation retardant for DRI material tending to re-oxidize when stored or handled and transported in contact with atmospheric air is disclosed.

Other aspects of the technology are herein pointed out or will be evident from the description thereof.

DETAILED DESCRIPTION

The present application will be better understood with reference to detailed description of certain specific non-limiting embodiments thereof. To facilitate reading the description of the application, same numerals are intended to designate same elements of the device illustrated in the attached figures.

Ideally, all the surface of the DRI pellets should be covered with the glycerin-water reoxidation retardant to prevent metallic iron from contacting ambient air but the full surface coating cannot be achieved unless pellets are fully immersed in the reoxidation retardant, which immersion has been proved as not necessary.

Counterintuitively, the present technology uses water as a component of the reoxidation retardant, instead of mineral oil or light hydrocarbons, which are non-oxidant compounds, and would be proposed in view of the risk of causing oxidation of metallic iron with water. However, the reoxidation retardant of the present technology provides good protection against reoxidation, even if it contains water.

There is no particular restriction regarding the source of glycerin. Any type of glycerin can be used to form the reoxidation retardant of the present technology. In some embodiments, glycerin obtained from biomass materials is used.

Figure 1:
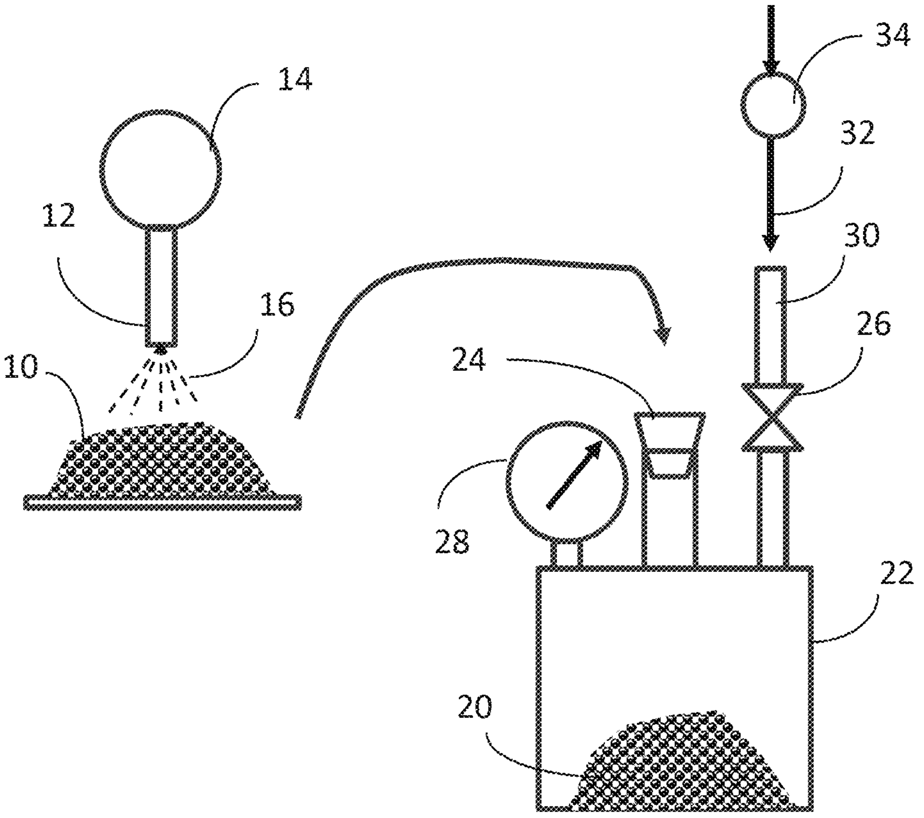
FIG. 1 is a schematic diagram of a system for determining the effectiveness of the reoxidation retardant, according to embodiments of the present technology.

Referring to FIG. 1, schematically illustrating the apparatus used for determining the reoxidation rate, this rate was measured as the amount of oxygen that is consumed by reaction with metallic iron in gr of oxygen per kg of DRI pellets per hour using different concentrations of glycerin in water in the reoxidation retardant measured as % by weight of the glycerin-water mixture.

The tests were carried out as follows: a sample of 500 grams of DRI pellets 10 were sprayed by means of an atomizing nozzle 12 from source 14 with a reoxidation retardant 16 comprising a mixture of glycerin and water at predetermined proportions.

The treated DRI pellets 20 are then placed in a reaction vessel 22 at 35° C. The pressure inside the reaction vessel 22 is set initially at 45 $cmH_2O$ measured by means of manometer 28 and the reaction vessel is hermetically sealed by means of stopper 24 and valve 26. Since oxygen inside the reaction vessel 22 is consumed by reoxidation of DRI, thereafter, the pressure is measured and registered every 5 minutes, indicating the amount of oxygen consumed by reoxidation of DRI. In order to maintain availability of oxygen for the reoxidation reactions, the pressure inside the flask is increased up to 45 $cmH_2O$ every 10 minutes.

The decrease in the gas pressure inside the reaction vessel allows calculation of the oxygen moles that have reacted with metallic iron. From these data the reoxidation rate was calculated and plotted.

The reoxidation rate is measured as grams of $O_2$/kg of DRI per hour spraying the reoxidation retardant with different proportions of glycerin in a mixture of glycerin and water. The reoxidation-rate values correspond to the accumulated amount of oxygen consumption at 80 minutes from beginning the test.

Figure 2:
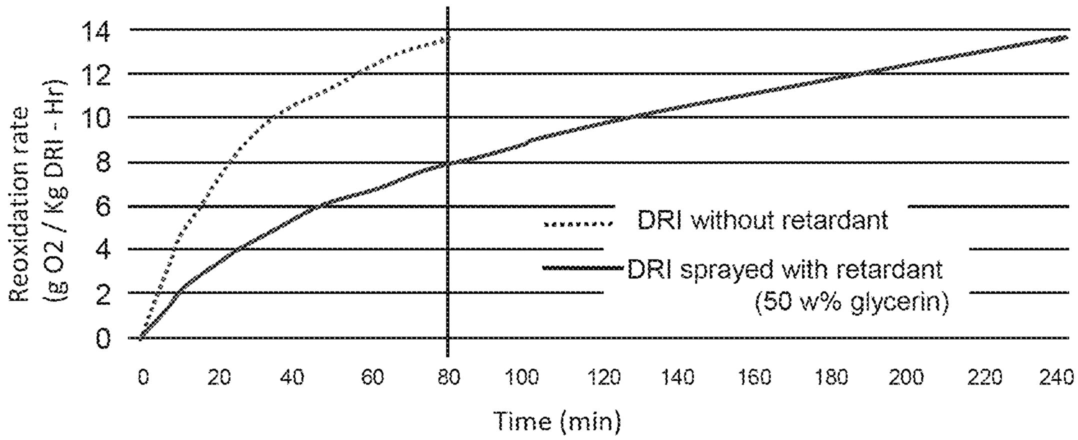
FIG. 2 is a graph showing results obtained from experimental tests where the relationship of the amount of oxygen consumed by DRI is plotted with respect to the test time.

The average values of results of the tests were plotted against time and are shown in Table 1 and FIG. 2. It can be seen that the reoxidation rate decreases as the proportion of glycerin decreases, and then increases, when compared to the reference rate which is a test without applying reoxidation retardant to the DRI sample. In some embodiments, the reoxidation retardant is effective in any proportion of glycerin to lower the reoxidation rate.

TABLE 1

| % by weight of glycerin | Test 1 | Test 2 | Test 3 | Average |
|---|---|---|---|---|
| 0 | 11.12 | 15.65 | 9.79 | 12.19 |
| 20 | 7.99 | 8.10 | 7.06 | 7.72 |
| 30 | 6.18 | 6.80 | 5.47 | 6.15 |
| 40 | 4.38 | 5.51 | 3.88 | 4.59 |
| 50 | 3.99 | 2.50 | 2.83 | 3.11 |
| 60 | 5.99 | 4.63 | 4.60 | 5.07 |
| 80 | 6.11 | 6.06 | 5.73 | 5.97 |
| 100 | 6.80 | 8.77 | 6.49 | 7.35 |

In some embodiments, the proportion of glycerin in the reoxidation retardant is between 20% by weight and 80% by weight. In some embodiments, the proportion of glycerin in the reoxidation retardant is between 40% by weight and 60% by weight. In some embodiments, the proportion of glycerin in the reoxidation retardant is between 45% by weight and 55% by weight. In some embodiments, the proportion of glycerin in the reoxidation retardant is between 48% by weight and 52% by weight. In some embodiments, the proportion of glycerin in the reoxidation retardant is 50% by weight. In some embodiments, the amount of reoxidation retardant sprayed over the surface of a bulk mass of DRI pellets is in the range between 30 and 70 kg per metric ton of DRI, e.g. between 3% by weight and 7% by weight.

TABLE 2

| Typical DRI physical properties | | |
|---|---|---|
| Characteristic | Unit | Value |
| Bulk density | $t/m^3$ | 1.5-1.9 |
| Average size | mm | 4-20 |
| Fines proportion (−4 mm) | % by weight | ~5 |

The volumetric porosity varies with the production technique and has a mean value of approximately 47.0%. The interaction of DRI with moisture is an important consideration; DRI tends to absorb moisture (12% by weight-15% by weight) from its surroundings, which can lead to oxidation and consequent quality degradation.

There is no particular restriction for applying the reoxidation retardant disclosed herein to any DRI in pellet or lump form and produced in any type of reduction furnaces, for example, moving-bed shaft furnaces, fluidized-bed furnaces, fixed-bed furnaces, rotary kilns, rotary hearth furnaces, and the like.

Figure 5:
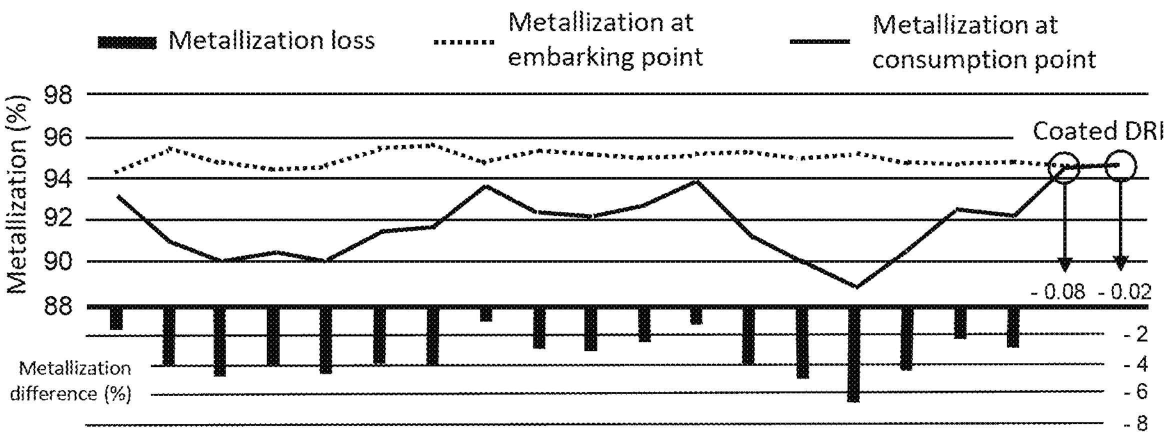
FIG. 5 is a graph showing the loss of metallization of DRI as it was transported a distance of about 1,000 Km from an embarking point to a point of consumption for DRI shipments that were not treated with glycerin and for DRI shipments that were treated with glycerin.

Referring to FIG. 5, it shows the results of experimental tests performed during several months to determine the metallization loss of DRI during storage and transportation between a point of production and a point of consumption over a distance of about 1,000 km. It can be seen that the DRI losses ranges from 1 to 6% metallization for DRI that has not been treated with the reoxidation retardant and that this loss is reduced to 0.02 or less when the DRI is treated with the reoxidation retardant.

Figure 6:
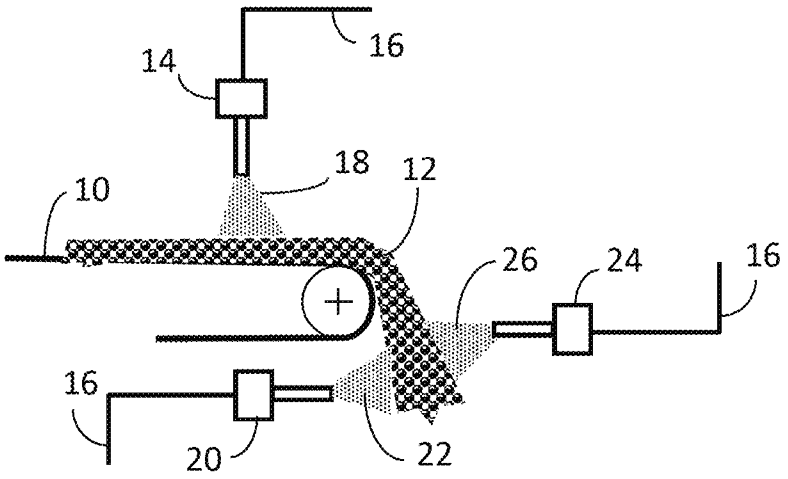
FIG. 6 is a schematic diagram of a system where the reoxidation retardant is sprayed over the surface of bulk DRI pellets in a conveyor, according to some embodiments of the present technology.

Referring to FIG. 6 showing a schematic diagram of a system for applying the reoxidation retardant to DRI pellets, according to some embodiments, where the system is sprays the reoxidation retardant on the surface of bulk pellets while they are being moved by a conveyor, where numeral 10 designates a belt conveyor moving DRI pellets 12. A spraying device 14 sprays reoxidation retardant 16 as a mist 18 over the surface of the bulk DRI pellets 12. In order to increase the surface area of DRI pellets 12 covered with reoxidation retardant 16, another spraying device 20 directing a mist 22 of reoxidation retardant 16 to the DRI pellets being dropped from conveyor 10 and also another spraying device 24 can be positioned at the opposite side 12 directing a mist 26 to the DRI pellets 12 so that most of the surface of DRI pellets is contacted with the reoxidation retardant 16.

Figure 7:
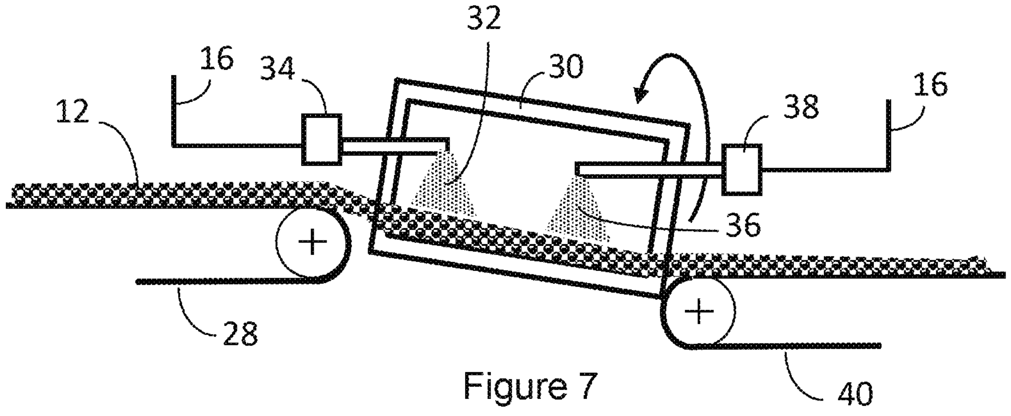
FIG. 7 is a schematic diagram of a system where the reoxidation retardant is sprayed over DRI pellets as they are being tumbled and rolling over in a rotary drum, according to some embodiments of the present technology.

Referring to FIG. 7, is a schematic diagram of another system for applying reoxidation retardant to the DRI, according to some embodiments, where the DRI granular material 12 is conveyed by conveyor 28 to a rotary drum 30 where pellets are tumbled inside the drum and consequently the surface of the DRI granular material is exposed to the mist 32 of reoxidation retardant 16 sprayed by spraying device 34 and also exposed to the mist 36 of reoxidation retardant 16 sprayed by spraying device 38. Rotation of rotary drum 30 causes the DRI granules to roll over and expose their surface during its sliding movement by gravity so that the DRI granules are discharged from drum 30 to conveyor 40.

Without being limited by theory, it is proposed that a high proportion of glycerin does not permit an effective dispersion of the reoxidation retardant over the surface of the DRI pellets due to its viscosity and that a low proportion of glycerin in the reoxidation retardant does not allow good coverage of the surface but rather enhances the potential reaction of metallic iron with water.

Figure 3:
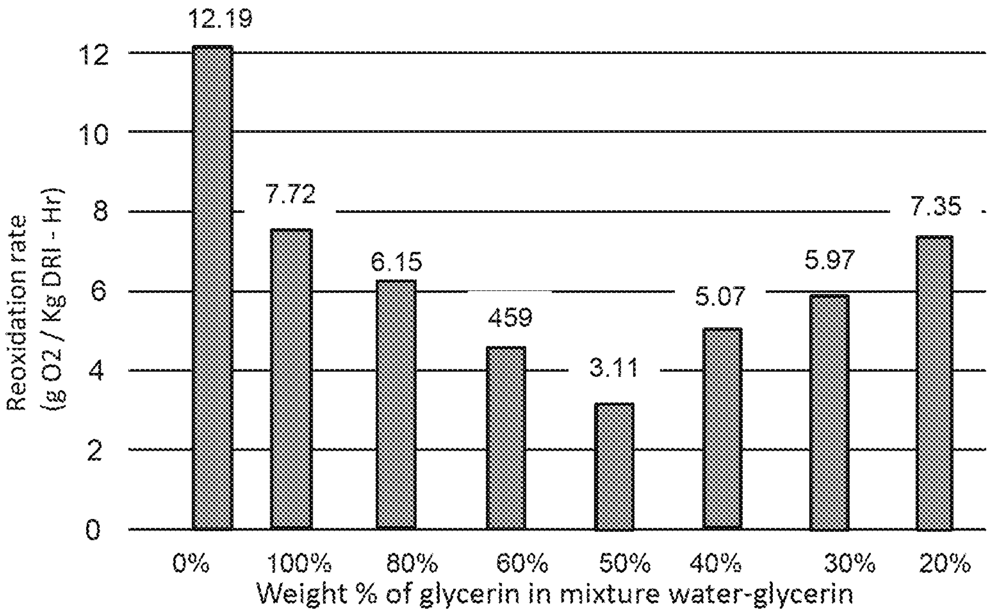
FIG. 3 is a graph showing the average consumption of oxygen (also known as the reoxidation rate) by DRI that has been treated with different reoxidation retardants having different proportions of glycerin in the reoxidation retardant, measured after 80 minutes from the moment of first contact of the treated DRI with air.
Figure 4:
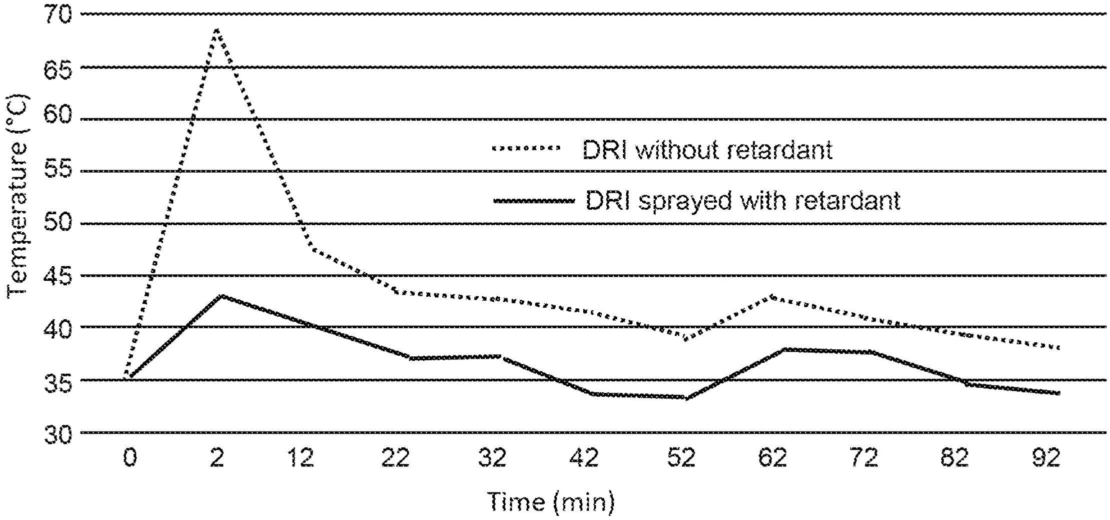
FIG. 4 is a graph showing a comparison of the temperature of two piles of DRI pellets that are in contact with atmospheric air at different exposure times, where one pile of DRI pellets has been sprayed with a reoxidation retardant comprising 50% by weight of glycerin and 50% by weight of water in a glycerin-water mixture while the other pile of DRI pellets has not been sprayed with the reoxidation retardant.

Variation of the viscosity of mixtures of glycerin and water as a function of the % by weight of glycerin at several temperatures is shown in FIG. 3. It can be seen that the variation of viscosity of glycerin-water mixtures is not linear for a given temperature. Viscosity changes several orders of magnitude from pure water to pure glycerin.

The reoxidation retardant of the application comprises a mixture of glycerin and water in the range between 40% by weight and 60% by weight where the viscosity of the mixture is under 80 cP. This range of viscosity permits an operator to spray the reoxidation retardant without requiring special pumps and piping in the range of ambient temperatures between 20° C. and 50° C.

The application comprises the DRI sprayed with a reoxidation retardant comprising a mixture of glycerin and water. DRI is typically in the form of pellets and/or lumps and a particle size in the range between 4 and 40 mm.

It is understood that the expressions "one embodiment", "some embodiments" and similar wording do not refer necessarily to the same embodiment and that the feature of the application referred to in this description may be combined in one or more embodiments of the application. Also, it is understood that the above description of some embodiments of the application is intended to be illustrative only and that changes may be made in the structure of the device, or the method described and its operating conditions without departing from the spirit and scope of the application defined in the attached claims.

What is claimed is:

1. A method for hindering reoxidation of direct reduced iron (DRI) granular material, the method comprising:

applying a reoxidation retardant over a surface of the DRI granular material, wherein the reoxidation retardant comprises a homogeneous mixture of glycerin and water, wherein the homogeneous mixture comprises between 40% by weight and 60% by weight of glycerin, wherein the DRI granular material has a first weight and the reoxidation retardant has a second weight that is between 3% and 7% of the first weight, and wherein, after applying the reoxidation retardant over the surface of the DRI granular material, an average reoxidation rate of the DRI granular material is between 3.11 and 5.07 grams of oxygen ($O_2$)/kilogram of DRI per hour.

2. The method of claim 1, wherein the glycerin is obtained from biomass materials.

3. The method of claim 1, wherein the DRI granular material is in the form of pellets of a size between 4 mm and 35 mm.

4. The method of claim 1, wherein applying the reoxidation retardant over the surface of the DRI granular material comprises spraying the reoxidation retardant over a pile of bulk DRI granular material.

5. The method of claim 1, wherein applying the reoxidation retardant over the surface of the DRI granular material comprises spraying the reoxidation retardant over the DRI granular material while the DRI granular material is being moved by a conveyor.

6. The method of claim 1, wherein applying the reoxidation retardant over the surface of the DRI granular material comprises spraying the reoxidation retardant over the DRI granular material while the DRI granular material passes through a rotary drum.

7. The method of claim 1, wherein a viscosity of the reoxidation retardant is between 0.8 cp and 80 cp.

8. A DRI granular material with hindered reoxidation produced according to the method of claim 1.

9. The DRI granular material with hindered reoxidation of claim 8, wherein the DRI granular material with hindered reoxidation is in the form of pellets, lumps, or a combination thereof.

10. The DRI granular material with hindered reoxidation of claim 8, wherein a particle size of the DRI granular material with hindered reoxidation is between 4 and 40 mm.

11. The method of claim 1, wherein the reoxidation retardant consists essentially of water and glycerin.

* * * * *